United States Patent [19]

Takagishi et al.

[11] 4,285,613
[45] Aug. 25, 1981

[54] APPARATUS FOR FORMING AND INSTALLING UNDERGROUND DRAINPIPE

[76] Inventors: Kenichiro Takagishi, 4223-11, Dazaifu-cho, Chikashi-gun, Fukuoka-ken; Yutaka Tsuda, 1260, Kokubu-cho, Kurume-shi, Fukuoka-ken, both of Japan

[21] Appl. No.: 82,305

[22] Filed: Oct. 5, 1979

[51] Int. Cl.³ .............................................. F16L 1/02
[52] U.S. Cl. ................................... 405/156; 405/174
[58] Field of Search ............................... 405/154–164, 405/174–183; 138/155, 156, 157, 162, 166, 167, 177, 178; 29/429

[56] References Cited

U.S. PATENT DOCUMENTS

| | | | |
|---|---|---|---|
| 3,193,432 | 7/1965 | Baines | 405/156 X |
| 3,208,478 | 9/1965 | Baines | 138/162 |
| 3,250,077 | 5/1966 | Ede | 29/429 X |
| 3,323,313 | 6/1967 | Owens | 405/174 |
| 3,360,894 | 1/1968 | Sharman et al. | 138/166 X |

*Primary Examiner*—Dennis L. Taylor

[57] ABSTRACT

Apparatus for forming and installing underground drainpipe in subterranean passages. The pipe is formed from a web of porous or non-porous sheet plastic which is drawn from a dispensing roll through curling and shaping devices protected by a transparent shield to provide a tube, these devices being mounted on a frame positionable in a trench or other depression in the soil. The end of the tube is attached to a mole at the end of a power driven blade, with the mole forming an underground passage for the following tube. Tensioning and positioning rollers are carried on the frame to feed the web to the tube forming devices at a predetermined angle and tension. A pressor roller and its support bracket interengage complimentary tongues and slots formed along the edges of the web for holding the web in its tubular form.

14 Claims, 8 Drawing Figures

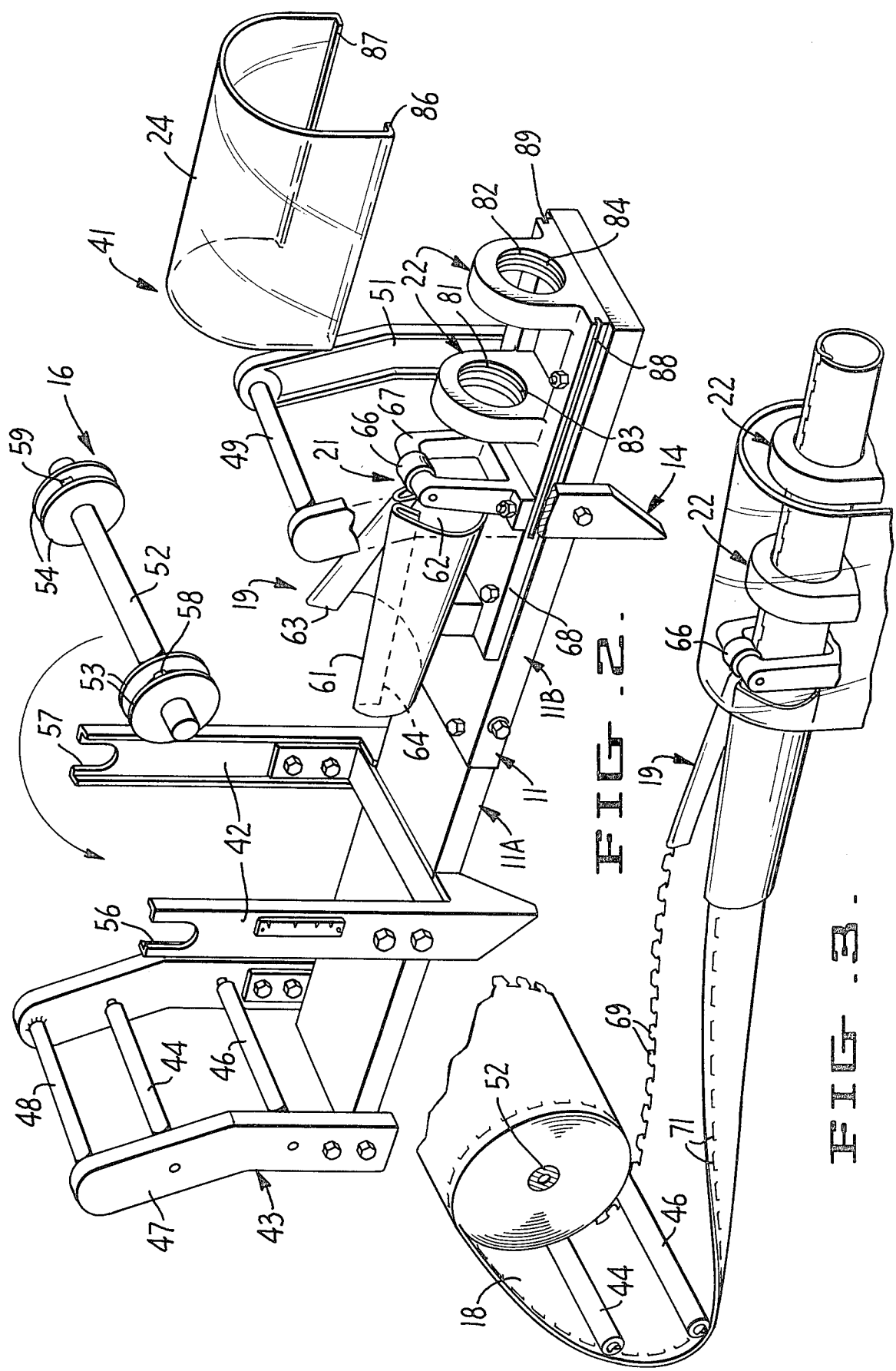

APPARATUS FOR FORMING AND INSTALLING UNDERGROUND DRAINPIPE

BACKGROUND OF THE INVENTION

1. Field of the Invention

The present invention relates to APPARATUS FOR FORMING AND INSTALLING UNDERGROUND DRAINPIPE, and more particularly to improvements in apparatus capable of forming drainpipe from a roll of plastic sheet material and simultaneously installing such pipe at desired underground locations without requiring trenching or filling operations.

2. Description of the Prior Art

It has heretofore been known to form plastic drainpipe from a roll of sheet material as the formed pipe is being drawn through an underground passage, as exemplified by Australian Patent Application No. 31565/77 dated Dec. 14, 1977, the Applicant being Sanko Co., Ltd. and Nippo Co., Ltd., and the actual Inventors being Kenichiro Takagishi and Yutaka Tusda, the Inventors in the herein application.

As stated in said Australian application, although the invention is discussed in terms of drainage pipe, it also relates to situations in which the pipe is not perforated and is used to convey water to a required destination.

As set forth in said Australian application, drainage has been practiced since olden times for land reclamation or improvement. Development of covered drains has been especially remarkable in the last few decades. The conventional covered drain, in general, either comprises an underground tube or a drain tunnel without a liner. Such drain tunnels are conventionally constructed by propelling a bullet-like head or "mole" along a desired underground path to displace the soft earth outwardly and leave behind the cylindrical drain tunnel. These drain tunnels, however, collapse easily because no support means is provided. Also, since the drain must usually be at a comparatively shallow depth, the drain tunnel tends to collapse when heavy equipment passes over it.

In humid regions where the soil is extremely soft, the drain tunnel collapses, at least in part, and must be renewed every year, resulting in considerable time, expense and labor.

To prevent collapse of the drain tunnel, drains with support means have been developed. They are constructed by digging a trench, placing tile or plastic tubes in the trench and subsequently refilling the trench with soil. Clay tubes are quite heavy and come in relatively short sections so that installation is quite laborious. Plastic tubes are lighter in weight, longer and are of sufficiently high strength, but the trenching and filling operation still makes them expensive and slow to install.

The apparatus of the present invention avoids the described difficulties by forming and laying the drainpipe simultaneously without requiring trenching or filling. The apparatus is designed to form the pipe automatically from a rolled web of sheet plastic as the pipe is dragged along behind the mole through the underground passage formed thereby.

Means is provided for shielding the critical forming operation from dirt and debris which might otherwise fall into this area and impair the forming of the drainpipe. In this connection, it should be noted that the web is manufactured with a series of tongues along one side interengageable in cooperating slots in the other side, the tongues and slots serving to hold the pipe in its finished configuration when fully interengaged. Unwanted dirt or debris falling into the portion of apparatus which effects complete interlocking can often prevent the described interlocking of the tongues and slots from taking place.

It is also essential that proper tension and angle of approach be exerted on the web of sheet plastic material as it is drawn through the portion of the apparatus which curls it from flat condition into generally tubular condition, and means is provided for accomplishing the tensioning and directing functions.

It is therefore an object of the present invention to provide an apparatus for installing a covered drain of the character set forth which is capable of trouble free operation under adverse conditions.

Another object of the present invention is to provide an apparatus of the character set forth which is capable of easy removal and installation in depressions in the soil in alignment with the proposed run of the resulting underground drainpipe.

A further object of the present invention is to provide apparatus of the character set forth in which the web of plastic sheet material is drawn from the supply roll, flattened out, curled into tubular form, and the locking tongues or tabs engaged in their respective slots under controlled conditions of tension and angle of approach.

Other objects of the present invention will in part be obvious and will in part appear hereinafter. For a fuller understanding of the nature and objects of the present invention, reference should be had to the following detailed description, taken in connection with the accompanying drawings.

BRIEF DESCRIPTION OF THE DRAWINGS

FIG. 2 is an exploded perspective view on an enlarged scale of the tube forming portion of the apparatus of FIG. 1, with portions broken away and shown in section for clarity.

FIG. 3 is a diagramatic perspective view illustrating the manner in which a web of sheet plastic materal is fed from a supply roll and curled into substantially a cylinder; tongues or tabs along one side of the strip being interlocked with slots along the other side of the strip and the pipe being pressed into its final substantially circular cross-sectional shape.

DESCRIPTION OF THE PREFERRED EMBODIMENT

Figure 1:
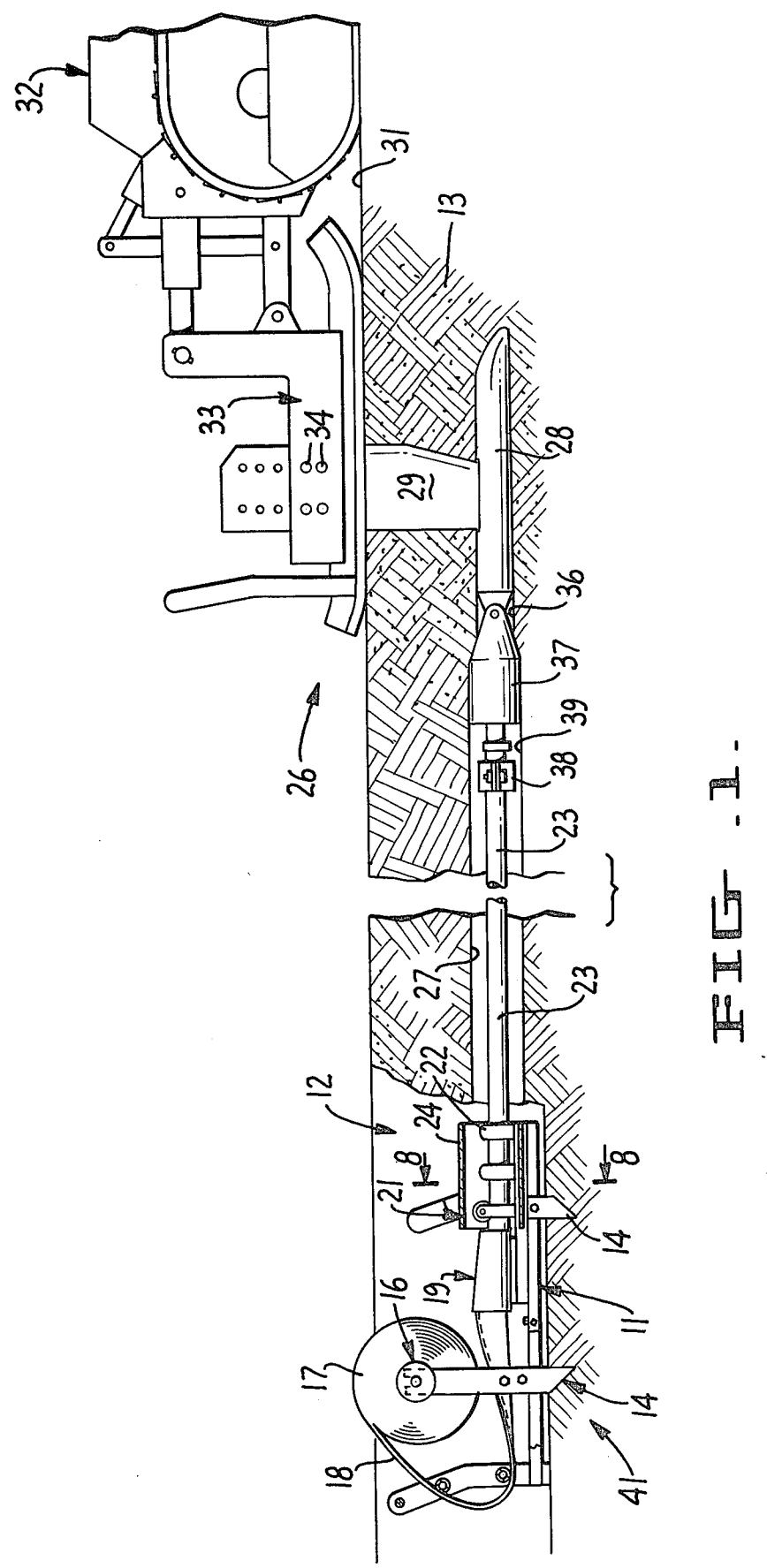
FIG. 1 is a side elevational view, partly in section, of an apparatus for forming and installing underground drainpipe constructed in accordance with the present invention, the apparatus being illustrated in the operative position assumed while forming an underground passage and shaping and drawing the drainpipe through such passage.
Figure 4:
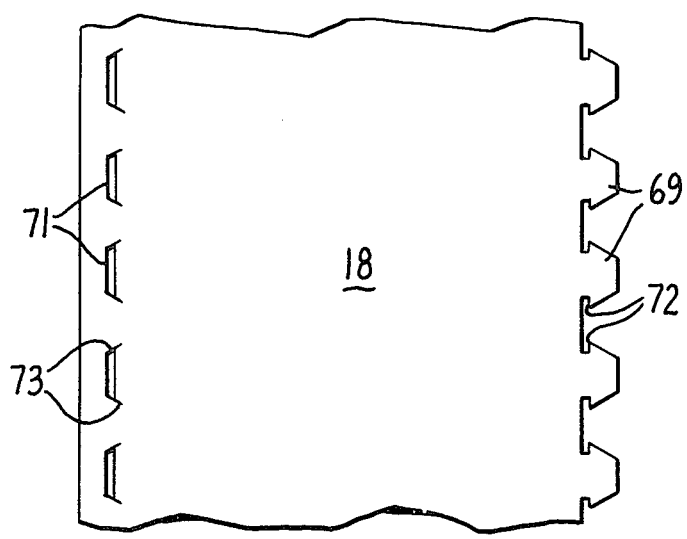
FIG. 4 is a plan view of a section of plastic sheet web or strip formed in accordance with the present invention and illustrating the construction of the interlocking tongues and slots.

As may best be seen in FIG. 1 of the drawings, the apparatus of the present invention includes an elongated frame 11 adapted for positioning in a depression 12 in the soil 13, means 14 for anchoring the frame 11 in place in the depression 12, dispensing means 16 on the frame 11 formed for carrying a roll 17 of semi-flexible sheet material 18, curling means 19 on the frame 11 formed for receiving the web 18 of sheet material from the dispensing means and for curling same to bring the side edges of the web into confronting relation, pressor means 21 on the frame 11 formed for receiving the curled web from the curling means 19 and pressing together the confronting side edges of the web, ring means 22 on the frame 11 formed for receiving the web from the pressor means and forming same into a tube 23 of substantially cylindrical cross-section, a transparent shield 24 overlying the ring means 22 and pressor means 21 and formed for preventing loose soil from falling into the ring and pressor means while permitting constant visual inspection, and means 26 for drawing the web 18 from the dispensing means 16 through the curling means 19, pressor means 21 and ring means 22 into a subterranean passage 27.

The means 26 includes a mole 28 mounted on a sharpened vertical blade 29 for positioning a spaced distance below the surface 31 of the soil. Propulsion is provided by a heavy duty tractor 32, or other prime mover, towing a sledge device 33 to which the blade 29 is adjustably attached as by bolts 34.

As the mole 28 is impelled through the earth, it leaves a bore 36 which is further enlarged by a trailing mandrel 37. Clamping means 38 is mounted on the trailing end of mandrel 37 and is formed for securely gripping the forward end of the tube 23.

As the mole 28 is propelled through the earth 13, the tube 23 is drawn through the enlarged passage 39 left by the mandrel 37, it being noted that the tube 23 is considerably smaller in diameter than the passage 39 so as to reduce frictional resistance.

As tube 23 is pulled from the tube forming apparatus 41, the web 18 is automatically curled, the tongues and slots interlocked, and the tube formed into its final shape.

As may be seen in FIG. 2 of the drawings, the tube forming apparatus 41 includes the dispensing means 16, the curling means 19, the pressor means 21 and the ring means 22, all mounted on the frame 11. In accordance with the present invention, the dispensing means 16 is carried on one frame section 11A and the curling means 19, pressor means 21 and ring means 22 are mounted on another section 11B of the frame. This construction facilitates placement of the tube forming means 41 in the depression 12, and makes it possible to substitute a section should repairs become necessary.

As here shown, the dispensing means 16 is rotatably mounted on an upward extension 42 of the frame 11, and means 43 for tensioning and positioning the web 18 is carried on the frame 11 interposed between the dispensing means 16 and the curling means 19, the means 43 being formed for supplying the web 18 to the curling means 19 at a predetermined angle and under predetermined tension.

As here shown, the tensioning and positioning means 43 comprises a pair of vertically spaced parallel rollers 44 and 46 carried on an upward extension 47 of the frame 11 at the end of the frame remote from the ring means 22. The frame extension 47 also provides a convenient carrying handle 48. A similar handle 49 is provided on an upward extension 51 of frame section 11B overlying the curling means 19, pressor means 21 and ring means 22.

The dispensing means 16 here includes a shaft 52 formed for receiving and supporting the roll of plastic web 17. Pairs of retaining collars 53 and 54 are removably mounted in parallel spaced relation near the ends of the shaft 52. U-shaped notches 56 and 57 are formed in the upper ends of frame extensions 42, and adjustable friction journals 58 and 59, between the pairs of collars 53 and 54, drop into notches 56 and 57 for rapid and simple mounting and dismounting of the roll 17 carried on shaft 52.

The positioning of shaft 52 relative to the rollers 44 and 46 and the curling means 19 provide a desired angle of entry of the web with respect to the curling means as it passes from the supply roll 17 and over the tensioning and positioning rollers 44 and 46, see FIG. 3.

As may best be seen in FIGS. 2 and 3 of the drawings, the curling means 19 is fabricated of sheet metal and formed into a tapered scoop shape having an open receiving end 61 adapted to receive the plastic web 18 from the dispensing means and an open receiving end 62 adjacent to the pressor means 21. The open receiving end 61 of the curling means 19 is generally in the shape of a partial elipse having its major axis horizontal. The discharge end 62 is generally circular, but the upper edges of the scoop converge together at the end 62 to define a generally pointed top. Inturned flanges 63 and 64 are provided along the upper edges of the scoop to define grooves through which the edges of the plastic web 18 pass as they are being brought together.

The pressor means 21 is positioned closely adjacent to the discharge end 62 of the curling means 19 and includes a roller 66 supported on a bracket 67 carried by a plate 68 which also supports the curling means 19. The roller 66 is lower than the edges of the web 18 emerging from the curling means 19 so as to urge these edges into overlapping relation. The drainpipe 23 formed from the web 18 is held in cylindrical condition by a series of tongues or tabs 69, along one edge of the web, which interlock with complimentary slots 71 formed along the other edge of the web.

Figure 5:
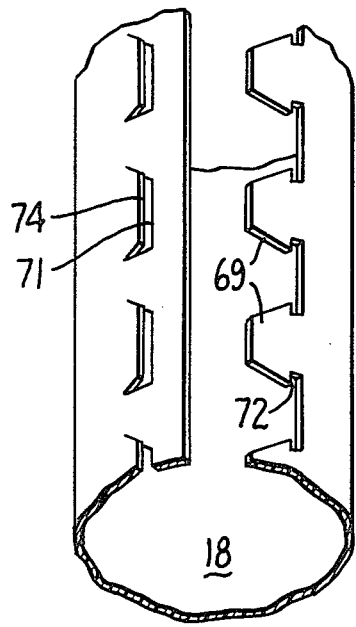
FIG. 5 is a perspective view of a portion of the strip of FIG. 4 being rolled into cylindrical form.
Figure 8:
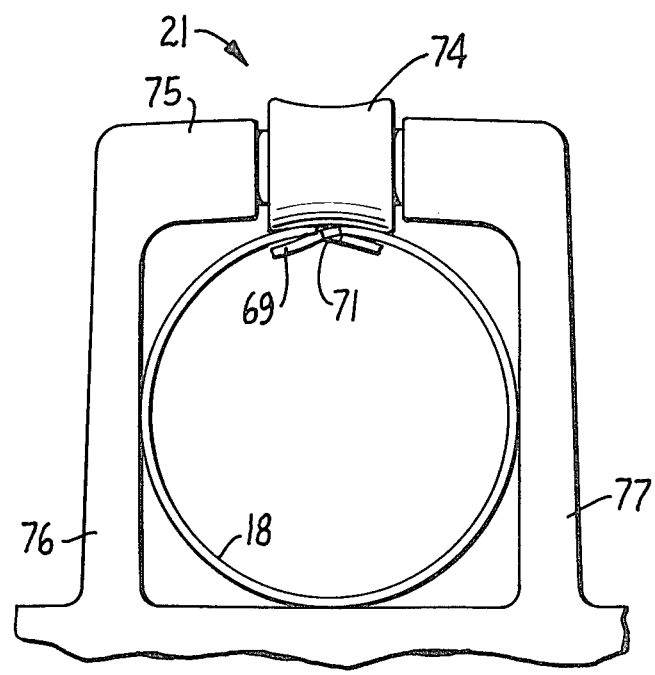
FIG. 8 is a vertical cross-sectional view on an enlarged scale taken substantially on the line of plane 8—8 of FIG. 1 and showing a pressor roller completing the interlocking of the tongue and slot means.

The structure and mode of interengagement of the tongues 69 in the slots 71 may best be seen in FIGS. 4 through 8 of the drawings. As there shown, the tongues 69 are shaped somewhat like an arrowhead with the point removed and provide shoulders or barbs 72 for holding the tongues 69 in their locked positions in the slots 71. Short angular slits 73 are cut from the ends of the slots 71 so that, when the web is curled into the cylindrical form as illustrated in FIG. 5, the portions 74 will rise above the cylindrical surface to facilitate entry of the tongues 69 into slots 71.

Figure 6:
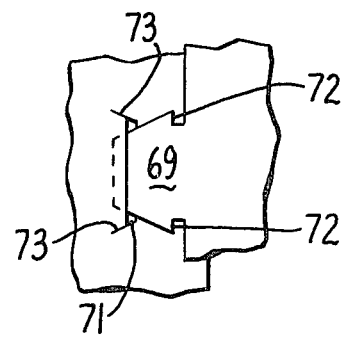
FIG. 6 is an enlarged fragmentary view of a single tongue or tab as it is being inserted into its corresponding slot.
Figure 7:
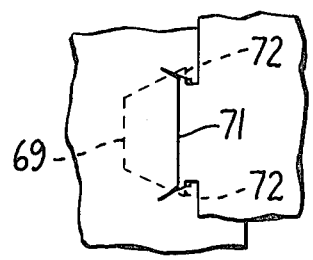
FIG. 7 is a fragmentary detailed view of the tongue of FIG. 6 fully engaged in the corresponding slot.

FIG. 6 illustrates partial entry of the tongues into the slots as is accomplished by the pressor means 21, while FIG. 7 illustrates the fully interlocked condition of the tongues in the slots.

As here shown, the pressor means 21 includes a roller 74 supported for rotation about a horizontal axis by a bracket 75 supported on plate 68.

As a feature of the invention, the sides 76 and 77 of the bracket 75 are dimensioned so that the sides of the formed tube 23 are confined against outward movement as the tongues 69 are pressed into the slots 71. This structure facilitates entry and pressing of the tongues 69 into the slots 71.

As the tube 23 passes from the pressor means 21, the tongues 69 are not fully interlocked in their respective slots 71, see FIG. 6. The web 18 is thus almost, but not quite, formed into a tube in the pressor means.

Completion of the tube is accomplished by the ring means 22 as the web is drawn through the ring means. As here shown, ring means 22 includes a first ring 81 having an innerdiameter smaller than that of the curled web as it passes from the discharge end 62 of curling means 19 and through the pressor means 21. The constricted diameter of ring 81 reduces the tube to the desired diameter and completes engagement of the tongues 69 in the slots 71 in the manner illustrated in FIG. 7 in the drawings. A second ring 82 may also be provided, with the rings constricting the tube stages. Preferably, and as here shown, the rings 81 and 82 are provided with linings 83 and 84 of low friction material, such as tetrafluoroethylene, for reducing frictional resistence as the tube 23 is being drawn through the ring means 22.

It has been found that soil and other debris, such as are often encountered in the field, dropping into the pressor means 21 and ring means 22 can seriously impair their working efficiency and cause hangups which can tear or break the formed drain tube. To alleviate this problem, an inverted U-shaped shield 24 is removably mounted on plate 68 in covering relation to the pressor means 21 and 22, by sliding inturned flanges 86 and 87 into longitudinal slots 88 and 89 formed in plate 68. The shield 24 is here shown as being transparent to permit constant visual inspection of the pressor means 21 and ring means 22 as they complete formation of the web 18 into the finished drainpipe 23.

What is claimed is:

1. Apparatus for forming and installing underground drainpipe, comprising:
    an elongated frame adapted for positioning in a depression in the soil;
    means for anchoring said frame in place;
    dispensing means on said frame formed for carrying a rolled web of semi-flexible sheet material;
    curling means on said frame formed for receiving the web of sheet material from said dispensing means and for curling same to bring the side edges of the web into confronting relation;
    pressor means on said frame formed for receiving the curled web from said curling means and pressing together the confronting side edges of said web;
    ring means on said frame formed for receiving the web from said pressor means and forming same into a tube of substantially cylindrical cross-section;
    a transparent shield overlying said ring means and pressor means and formed for preventing loose soil from falling into said ring and pressor means while permitting constant visual inspection;
    and means for drawing said web from said dispensing means through said curling and pressor and ring means into a subterranean passage.

2. Apparatus as described in claim 1, and wherein said dispensing means is rotatably mounted on an upward extension of said frame higher than said curling means, and tensioning and positioning means is carried on said frame interposed between said dispensing means and said curling means and formed for supplying the web to said curling means at a predetermined angle and tension.

3. Apparatus as described in claim 2, and wherein said tensioning and positioning means comprises a pair of vertically spaced parallel rollers carried on an upward extension of said frame at the end thereof remote from said ring means.

4. Apparatus as described in claim 1, and wherein said dispensing means comprises a transverse shaft journalled in U-shaped notches formed in the upper ends of an upward extension of said frame, whereby a roll of plastic web material mounted on said shaft is positioned higher than said curling means and is rotatable on said shaft.

5. Apparatus as described in claim 4, and wherein a pair of rollers are journalled in vertically spaced parallel relation on an upward extension of said frame at the end thereof remote from said ring means for providing a desired angle of entry of the web passing over said rollers with respect to said curling means.

6. Apparatus as described in claim 1, and wherein said pressor means supported on a bracket and having a member formed to bear down on said confronting edges of the curled web, said bracket being proportioned to confine the curled web against flattening under the influence of said pressor means.

7. Apparatus as described in claim 6, and wherein said pressor means member is a roller.

8. Apparatus as described in claim 6, and wherein the side edges of said web are formed with interlockable tongues and slots and said pressor means is formed for automatically inserting said tongues into said slots as the curled web passes therethrough.

9. Apparatus as described in claim 1, and wherein said means for anchoring said frame in place comprises pairs of sharpened downwardly extending legs carried in longitudinally spaced relation on said elongated frame, with the legs of one such pair having vertical flat faces confronting similar vertical flat faces on the legs of the other such pair.

10. Apparatus as described in claim 1, and wherein said curling means is formed of sheet metal and comprises a tapered scoop having an open receiving end adapted to receive said web from said dispensing means and an open discharge end adjacent to said pressor means,
    said open receiving end of said curling means being formed generally in the shape of a partial ellipse having its major axis horizontal,
    and said discharge end being formed generally circular but with a pointed top,
    said sheet metal being formed to provide a smooth transition from said receiving end to said discharge end.

11. Apparatus as described in claim 10, and wherein the longitudinal edges of said tapered scoop approach each other in the direction of passage of the web therealong, and said longitudinal edges of said scoop are folded inwardly to provide slots for receiving and directing the edges of the web of semi-flexible material.

12. Apparatus as described in claim 1, and wherein said ring means comprises a plurality of individual rings carried on said frame in axially aligned longitudinally spaced relation on said frame in position for receiving the curled web emitted from said pressor means.

13. Apparatus as described in claim 6, and wherein the edges of said web are formed with a series of tongues on one edge interlockably engageable with a series of complimentary slots on the other edge as said web passes through said curling and pressor means.

14. Apparatus as described in claim 1, and wherein said means for drawing said web from said curling and pressor and ring means comprises:

a power driven device movable along the surface of the soil;

a blade depending downwardly from said device and formed for slicing through the soil to a desired depth;

a cylindrical mole on the lower end of said blade formed for displacing the earth to form a cylindrical passage dimensioned for slidably receiving the tube formed from the web as said blade and mole are drawn through the soil;

and means for attaching the leading end of the tube whereby the web is drawn from said dispensing means, formed into a tube, and the tube is drawn through the cylindrical passage provided by said mole.

* * * * *